Figure 1A:
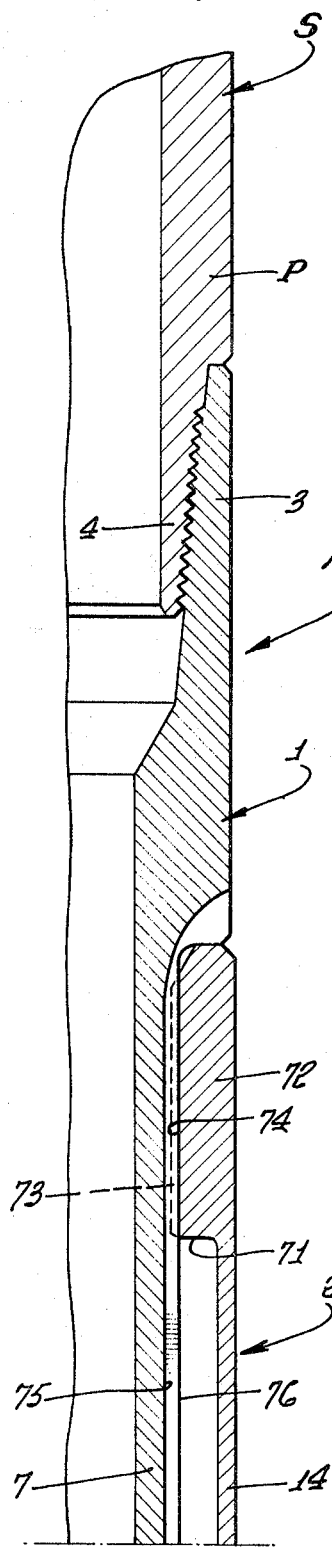
Figure 1B:
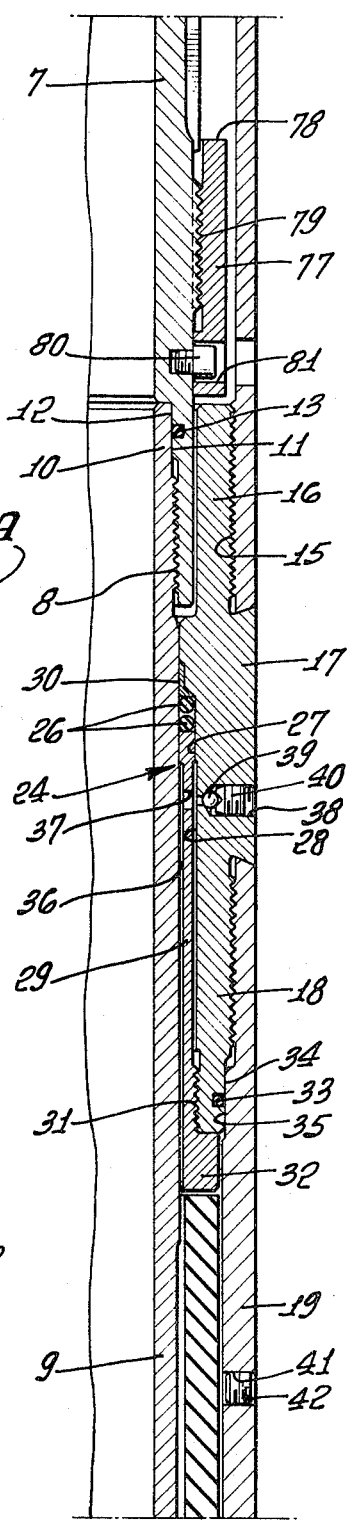
Figure 1C:
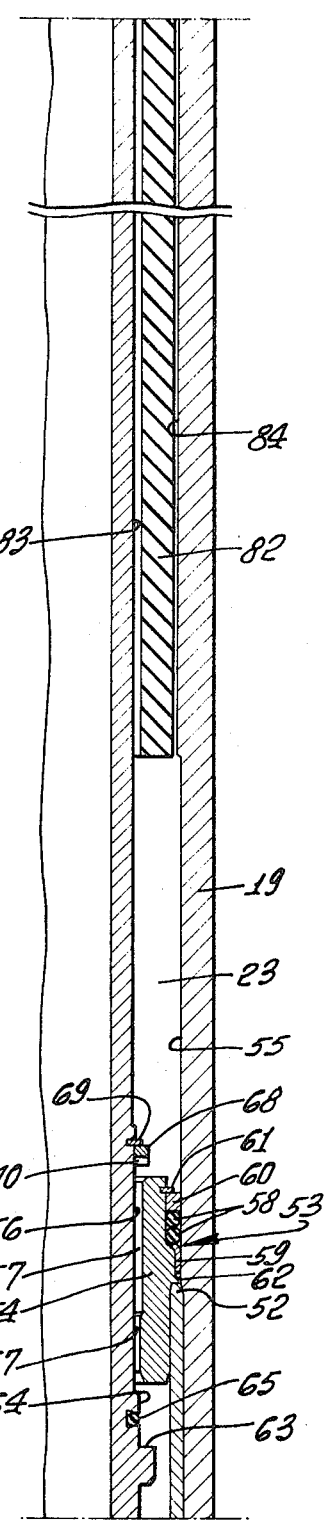

United States Patent [19]
Berryman

[11] 3,735,828
[45] May 29, 1973

[54] ACCELERATOR FOR FISHING JARS

[75] Inventor: William O. Berryman, Houston, Tex.

[73] Assignee: Baker Oil Tools, Inc., Los Angeles, Calif.

[22] Filed: Mar. 15, 1972

[21] Appl. No.: 234,736

[52] U.S. Cl. ................175/299, 175/321, 166/178
[51] Int. Cl. ........E21b 1/06, E21b 1/10, E21b 23/00
[58] Field of Search ...................166/178; 175/293, 175/296, 297, 299, 300, 302, 303, 34

[56] References Cited
UNITED STATES PATENTS

| | | | |
|---|---|---|---|
| 3,472,326 | 10/1969 | Sutliff et al. | 175/321 X |
| 3,539,025 | 11/1970 | Sutliff et al. | 175/297 |
| 3,539,026 | 11/1970 | Sutliff et al. | 175/299 |
| 3,570,612 | 3/1971 | Slator | 175/297 |
| 3,606,297 | 9/1971 | Webb | 175/321 X |
| 3,642,069 | 2/1972 | Adkins | 175/296 X |

*Primary Examiner*—David H. Brown
*Attorney*—Bernard Kriegel

[57] ABSTRACT

An accelerator for fishing jars for removing stuck objects from a well bore located above a drill collar string, the jar being located between a fishing tool and the drill collar string. A resiliently compressible body of rubber-like material is disposed in a pressure chamber in the accelerator containing a lubricating oil pressure transfer medium to apply pressure to all surfaces of the compressible body and reduce its volume when the fishing string is tensioned, the compressible body acting as a spring on expansion to accelerate the drill collar mass when the jar is released to produce the jarring action. The resilient material has a high impedance to the transmission of sound to improve jarring efficiency.

17 Claims, 6 Drawing Figures

PATENTED MAY 29 1973 3,735,828

SHEET 1 OF 2

PATENTED MAY 29 1973
3,735,828
SHEET 2 OF 2
Fig. 1d.
Fig. 1e.
Fig. 2.
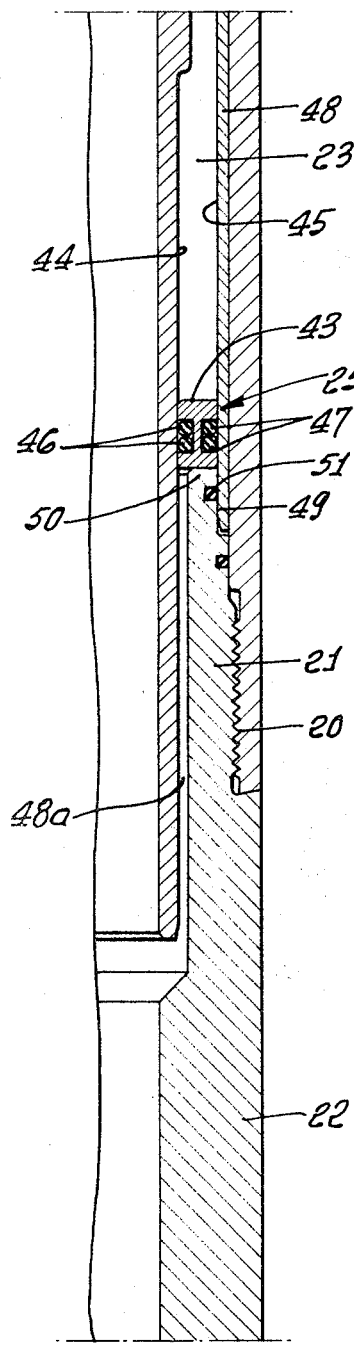
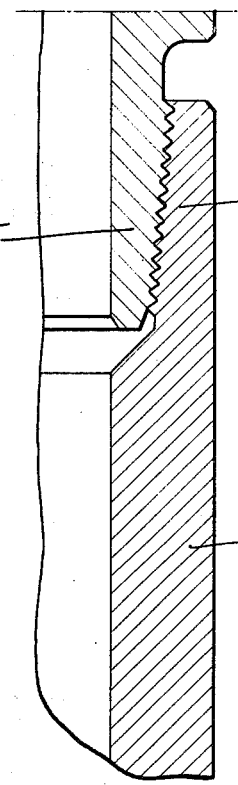
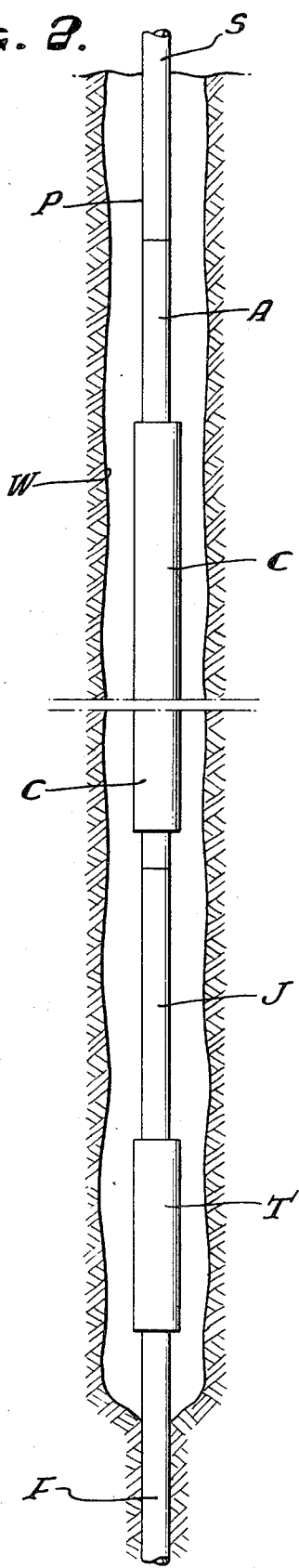

ACCELERATOR FOR FISHING JARS

Fishing jars are employed when it becomes necessary to remove from a well bore extending into the earth, such as an oil or gas well, various "fish," such as a length of drill pipe or a subsurface tool which may be stuck in the well bore. Typically, fishing jars are run at the lower end of a string of drill pipe, commonly referred to as the fishing or running string, in a position above the fishing tool, which may be a spear or overshot adapted to engage and grip the fish, enabling the fish to be pulled from the well bore upon pulling the fishing string. The jar is employed for the purpose of applying hammer blows tending to release the stuck fish while the fishing string is under tension. Jars of the hydraulic type, in general, comprise a pressure chamber containing a quantity of hydraulic fluid which is compressed when an upward strain or tension is applied to the running string. When the compressed hydraulic fluid is allowed to rapidly by-pass a compression piston, the tension of the running string causes a hammer to impact against an anvil to apply a jarring or hammer blow tending to release or remove the stuck object or fish.

The magnitude of the hammer blow is a function of the tension applied to the fishing string and the mass of the fishing string, which must be accelerated upwardly. The fishing string ordinarily includes heavy drill collars between the fishing tool and the drill pipe. To be effective, the tension in the fishing string must rapidly accelerate the drill collars, since the hammer blow is determined by the mass and velocity of the drill collars at the moment of impact of the hammer against the anvil. Thus, various accelerator devices have evolved which are adapted to provide a spring force acting between the jarring tool and the fishing string to assist in the acceleration of the upward movement of the jarring hammer by accelerating upward movement of the drill collars. Such accelerators have utilized a compressible gas in a compression chamber or a compressible liquid, such as oil, to provide a spring force capable of accelerating the upward motion of the fishing string. To enable sufficient stroke of the accelerator, the compressible oil is usually a silicone oil having, as compared with better lubricating oil, a low bulk modulus, since a lubricating oil, in general, has such a high bulk modulus that a compression chamber of excessive length is required.

Moreover, in the absence of an accelerator, the acceleration of the drill collars is affected by the upward travel of the wave front, instantaneously produced upon release of the jar, which travels upwardly at the speed of sound through the drill collars and is partially reflected downwardly at the interface of the drill collars with the drill pipe above the drill collars through a number of cycles before the hammer of the jar impacts with the anvil. The acceleration of the drill collars is accentuated with the upward phase of each cycle of the wave front. Since fishing operations involve the circulation of fluid downwardly through the fishing string of pipe, it is inherent that the pipe string is of substantial area and much of the sonic wave front is transmitted from the drill collars to the drill pipe, thereby diminishing the reflected wave, which moves downwardly through the drill collars and then turns around and moves upwardly to assist in accelerating the drill collar mass upwardly before the hammer strikes the anvil in the jar.

The present invention involves the provision of an accelerator which has a compression chamber containing a resiliently compressible rubber or rubber-like material having a low bulk modulus and a high rate of recovery, and provides substantial spring force in a small space for accelerating upward movement of a drill collar mass that produces the jarring force in a fishing jar.

In accordance with the invention, the resiliently compressible material has a low product of mass density times speed of sound, so that the relatively high impedance to the transmission of sound results in a reflected wave of proportionally high value when the wave front produced at the time of release of the jar travels upwardly through the drill collars to the accelerator.

More particularly, the present invention involves utilizing a rubber-like material in the compression chamber of the accelerator which has a low bulk modulus, such as silicone rubber, that permits a small volume of the material to be used in the compression chamber for the desired energy to be stored in the material and stroke of the accelerator, thereby reducing the overall length of the compression chamber and of the accelerator itself. By way of example, silicone rubber has a bulk modulus of 150,000 p.s.i., as compared with the average rubber which has a bulk modulus of 345,000 p.s.i., the silicone rubber being far more compressible than the average rubber and, consequently, being far more expansive than the average rubber when both types of rubber are subjected to the same compressive force. Accordingly, for the same compressive force and extent of expansion, the compression chamber with silicone rubber therein can be much shorter than with an average rubber therein. The rubber material is disposed in the chamber and surrounded by a fluid pressure transfer medium, which applies pressure to all surfaces of the rubber material to resiliently compress or deform it. Since the fluid is not relied upon to provide the spring action, the fluid may be a good lubricating oil to prevent galling of the telescopic parts of the accelerator, and the hazards of pressure filling of gas accelerators are avoided.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such a detailed description is not to be taken in a limiting sense.

Referring to the drawings:

FIGS. 1a through 1e together constitute a longitudinal quarter section through an accelerator device made in accordance with the invention, FIGS. 1b through 1e being, respectively, successive downward extensions of FIG. 1a; and FIG. 2 is a view showing a fishing string, including a jar and an accelerator in a well bore and connected to a fish by a fishing tool.

As seen in the drawings, the accelerator A of the invention comprises an elongated and telescopic assembly of an inner tubular body or mandrel 1 and an outer tubular body or housing 2. At its upper end, the mandrel 1 is provided with an internally threaded box 3 adapted to receive the externally threaded pin 4 at the lower end of an upwardly extended section of drill pipe P included in the fishing string S, which is adapted to extend to the top of a well bore W so that tension can be applied to the fishing string to operate a jar J for applying hammer blows to a fishing tool T, such as a spear or an overshot, to a pipe or other fish F, stuck in the well bore W. Typically, such jars are so constructed that they are adapted to sustain a predetermined pull and they then release to enable a hammer to strike an anvil. By way of example, the jar may be of the down-hole adjustable type shown in co-pending application Ser. No. 234,737, filed Mar. 15, 1972, for "Down-Hole Adjustable Hydraulic Fishing Jar." A string of drill collars C are interposed between the accelerator A and the jar J to provide a heavy mass to be accelerated upwardly by energy stored in the fishing string S and in the accelerator A, as is well known. The lower end of the accelerator housing 2 has a threaded pin 5 engaged in a threaded box 6 at the upper end of the drill collars C.

More particularly, the body or mandrel 1 comprises an upper tubular body section 7 internally threaded at 8 to receive the upper, externally threaded end of a lower body or mandrel section 9. The upper end portion 10 of the mandrel section 9 has an external cylindrical wall 11 opposed by a complemental cylindrical wall 12 on the mandrel section 7. A suitable ring seal 13 is provided between the walls 11 and 12 to prevent leakage of fluid circulated through the accelerator during a fishing operation.

The outer body or housing 2 is shown as comprising an upper tubular housing section 14, having a lower threaded connection 15 with the neck 16 of an annular cylinder head 17. This cylinder head 17 also has an externally threaded skirt 18 connected to the internally threaded upper end of an elongated cylinder or outer body member 19, the lower end of which is internally threaded at 20 to receive the externally threaded upper end portion 21 of a lower body member and connector 22 having the threaded pin 5 thereon connected to the drill collars C.

The inner body member or mandrel section 9 and the outer body member or cylinder 19 define therebetween an elongated, annular chamber 23, closed at its upper end by upper seal means 24 and at its lower end by lower seal means 25. The upper seal means 24 comprises a pair of packing or seal rings 26 disposed between the outside wall of the mandrel section 9 and an opposing cylindrical wall 27 defining a bore 28 in the cylinder head 17. A sleeve 29 extends upwardly in the bore 28 to form with a seal back-up member 30, at the top of the bore 28, an annular internal groove in which the seal rings 26 are disposed. At its lower end, the sleeve 29 is threaded into the internally threaded lower extremity 31 of the cylinder head skirt 18, the skirt 18 having a lower flange 32 abutting beneath the skirt 18. Also, the chamber 23 is sealed by a seal ring 33 between opposing sealing walls 34 and 35 on the skirt 18 and the cylinder 19. The sleeve 29 defines with the mandrel section 9 a clearance 36 which communicates, through a suitable number of radial ports 37 in the sleeve 29, with a bleed port 38 in which is a bleeder valve 39 held closed by a plug 40. At a suitable location below the cylinder head 17, the housing 2 has an inlet or fill opening 41 and plug 42, whereby the chamber 32 may be filled with hydraulic pressure transfer fluid, and air can bleed off through the bleed opening 38.

The lower seal means 25 comprises an annular piston 43 reciprocable in the chamber 23 between opposed, cylindrical walls 44 and 45 of the inner and outer bodies 1 and 2. This piston has inner seal rings 46 slidably and sealingly engaging the cylindrical wall 44 and outer seal rings 47 slidably and sealingly engaging the cylindrical wall 45. Below the piston 43, the chamber 23 communicates with the fluid passage through the tool via an annular space 48a which opens into the lower body section or connector sub 22. Therefore, the piston 43 is a compensating piston to balance pressure in the chamber with pressure in the running or fishing string of pipe.

In the embodiment shown, the cylindrical wall 45 engaged by the compensating piston 43 is provided by a sleeve or liner 48 disposed within the housing section 19 and seating at its lower end between a cylindrical wall 49 of an end flange 50 on the neck 21 of the connector 22 and the inside wall of the housing section 19, a seal ring 51 being provided about the end flange 50 to seal against the liner 48. At its upper end, the liner 48 provides a radial stop shoulder 52 which cooperates with compression piston means 53, now to be described, to limit downward movement of the latter.

The compression piston means 53 are operable to compress fluid in the chamber 23 upon telescopic extension of the bodies 1 and 2, when the fishing string S is tensioned. When the jar is operated and the bodies 1 and 2 are telescopically contracted, the piston means 53 allow the by-pass of fluid in the chamber to again enable equalization of internal and external pressures by the compensating piston 43.

More particularly, the compression piston means 53 comprises an annular piston body 54 slidably engageable within the cylindrical inner wall 55 of the housing cylinder 19 and having an inside diameter larger than the cylindrical wall 56 of the mandrel section 9, to provide an annular flow passage 57 between the piston 54 and the mandrel section 9. About its outer periphery, the piston 54 has a pair of seal rings 58 disposed between a back-up ring 59 and an opposed ring 60 retained on the piston by a lock ring 61, so that the seal rings 58 are in sliding and sealing engagement with the cylinder wall 55. A stop shoulder 62 on the piston 54 is engageable with the upper end 52 of the liner 48 to limit downward movement of the piston 54.

A lifter or shoulder 63 for moving the piston 54 upwardly in the chamber 23 is provided on the mandrel section 9, to be spaced below the lower end of the piston 54 when the bodies 1 and 2 are telescopically contracted, as shown. Above the shoulder 63, the mandrel section 9 has a cylindrical surface 64 and a seal ring 65, constituting a valve sealingly engageable in a bore 67 in the lower portion of the piston 54 when the mandrel 1 is elevated with respect to the housing 2, to prevent fluid from bypassing the piston 54 through the annular space 57, and causing telescopic extension of the mandrel 1 and housing 2 to effect compression of the medium within the chamber 23 as the piston 54 is shifted upwardly in the cylinder 19. Return downward movement of the piston 54 is assured by an abutment above the piston on the mandrel section 9, in the illustrated form of a stop ring 68 held against upward movement by a lock ring 69, the stop ring 68 having flow passages 70 to allow fluid to by-pass the piston 54 as it is being moved downwardly in the cylinder 19.

Telescopic extension of the mandrel 1 and the housing 2 and, hence, movement of the compression piston means 53 toward the upper seal means 24 is limited by cooperative portions of the mandrel 1 and the housing 2. As shown, the upper end of the housing section 14 has a downwardly facing shoulder 71 formed on a head 72. Internally, the head 72 has a splined sliding connection with the upper mandrel section 7, consisting of ribs 73 and grooves 74 extending longitudinally of the head 72 and companion grooves 75 and ribs 76 extending longitudinally of the mandrel section 7 at circumferentially spaced locations. Adjacent to the lower end of the mandrel section 7 is a stop collar 77, the upper end 78 of which is opposed to the mandrel shoulder 71 to engage with the latter upon upward movement of the mandrel 1 with respect to the housing 2. This stop collar is threaded at 79 onto the mandrel section 7 and locked in place by a cap screw 80 threaded into the mandrel section 7 and having its head disposed in a lateral opening 81 in the stop collar 71.

As thus far described, the accelerator A is operable when the running or fishing pipe string S is tensioned to apply tension to the jar J, to compress the medium in the chamber 23 to an extent determined by the magnitude of the tension applied to the fishing string to release the jar J, as is well known, until the jar releases and allows the drill collars C to move upwardly, accelerated by stored energy in the tensioned fishing string S and in the accelerator A. The force of the jarring action is, generally, determined by the mass of the moving drill collars and the drill collar velocity at impact of the jarring hammer with the anvil in the jar apparatus.

The present invention involves the utilization of a compressible or resiliently deformable material in the chamber 23 which is, within the inherently small available annular space, capable of being reduced in volume and storing substantial energy useful, upon release of the jar J, to assist the fishing string tension in accelerating the upward motion of the drill collars C, to increase the effective velocity and the resultant force of the hammer blow. In accomplishing this purpose, the preferred material is an elastomer, devoid of cavities, and having a low bulk modulus, such as silicone rubber, the bulk modulus of which is 150,000 p.s.i. In addition, a material is preferable which has a high impedance to sound transmission, so that the jarring effectiveness is further enhanced.

Thus, a body 82 of rubber or rubber-like material, which is resiliently deformable or compressible to reduce its volume and which rapidly recovers when deforming pressure is released, is disposed in the compression chamber 23 to be deformed therein under pressure when the accelerator is telescopically extended, and provide a high rate resilient force to cause telescopic contraction of the accelerator when the jar is released.

As shown, the resilient body 82 is of cylindrical form and is disposed between opposing cylindrical walls 83 and 84 defining the compression chamber 23, the body 82 being much shorter than the distance between the flange 32 and the piston 54 when resting on the shoulder 52. The radial thickness of the body 82 is less than the radial distance between the walls 83 and 84, and therefore, the fluid or hydraulic oil in the chamber 23 can contact both the inner and outer cylindrical walls of the body 82. In addition, the resilient body 82 is exposed at its ends to the pressure of fluid or oil in the chamber 23 and fills sufficient space in the chamber 23 as to constitute the effective energy storing means. Thus, pressure applied to the resilient body upon upward movement of the compression piston means 53 is applied through the liquid in the chamber 23 to all surfaces equally by the fluid pressure transfer medium or liquid, to compress the resilient body 82 in all directions. Preferably, the body 82 is formed of a solid rubber or rubber-like material, such as silicone rubber, which is devoid of air pockets or cells, the material having a high rate of recovery from compression and capable of storing more energy in a given space than can be stored by hydraulic fluid or oil, thereby producing a longer stroke to assist in accelerating the drill collars C when the jar releases. Since the fluid medium in the chamber 23 does not store the substantial energy which assists in accelerating the drill collars, the fluid is selected from oils which have good lubricating qualities to reduce friction.

In addition, rubber or rubber-like materials, such as silicone rubber, have a high impedance to sound, as compared with oil or hydraulic fluid. Therefore, the transmission of sound waves through the accelerator assembly from the drill collars to the drill pipe is impeded by the use of the resilient, energy storing body 82, and the accelerator is more effective for a given length. Thus, when the upwardly moving wave front travelling through the drill collars, instantaneously caused in the drill collars when the jar is released and upward acceleration of the drill collars commences, reaches the accelerator A, the increased impedance of the accelerator caused by the resilient body 82, results in a reduction in the transmission of the upwardly moving wave front through the accelerator, and more energy is reflected downwardly. In this connection, the value of the reflected wave is determined by the area of the accelerator as compared with the area of the drill collars and the velocity of sound through them, and as the value of the reflected wave is increased, the lower the product of mass density of the medium in the chamber 23, including the resilient body 82, times the speed of sound. The high impedance also reduces the net reflection of the wave front at the connection between the accelerator A and the drill pipe P, which could, otherwise, tend to damp out the useful wave front travelling upwardly in the drill collars C. The period of time required for the jarring action to occur, after release of the jar, is sufficient to enable the reflected wave front to travel downwardly through the drill collars C from the interface with the accelerator and again return upwardly through a number of cycles, and at each turn around of the wave front at the bottom of the drill collars, the acceleration of the drill collars is increased, to thereby increase the effective hammer blow of the jar, which is determined by the mass and velocity of the drill collars at impact of the usual hammer and anvil.

Summarizing the operation of the invention, as illustrated in FIG. 2, the fishing string is lowered in the well bore W, with the drill pipe P connected to the upper end of the accelerator A, below which are the drill collars C and the fishing tool F. The fishing tool F is connected to the fish or stuck pipe in the usual manner, and, as desired or necessary, fluid is circulated downwardly through the fishing string.

Tension is applied to the fishing string and through the accelerator to the drill collars, the fishing tool and the fish until the desired or established tension for releasing the jar is reached.

During tensioning of the fishing string, the accelerator mandrel 1 moves upwardly with respect to the housing 2, and the compressible medium in the pressure chamber 23 is compressed by the compression piston means 53. The compressive force applied to the fluid or oil in the chamber 23 is transferred or applied to all surfaces of the compressible body 82, causing it to resiliently reduce in volume until the maximum tension is applied to the fishing string, or until the stop collar 77 on the mandrel 1 engages the stop shoulder 71, to limit further compression of the fluid medium and the rubber body 82 in the chamber 23. The use of the body 82, instead of oil, to store the energy enables the accelerator assembly to produce, relatively, a longer effective stroke for the length of the tool and the magnitude of the compressive force, as well as enabling the use of a selected lubricating oil.

When the jar releases and the mandrel 1 and the drill collars C are moved upwardly by energy stored in the fishing string and the accelerator, the energy stored in the rubber body 82 maintains an upward force on the accelerator housing 2 throughout the entire jarring stroke, until the jarring hammer strikes the anvil, as is customary in fishing jars.

Inasmuch as the wave front originating at the bottom of the drill collars and travelling upwardly therethrough at the speed of sound is transmitted through the accelerator to an extent determined by the area and material of the accelerator, and a proportional reflected wave returns downwardly through the drill collars, then turns around and assists in accelerating the drill collars, the invention provides an accelerator which has a high impedance to sound by utilizing as the compressible material or body 82 a high impedance material, such as rubber.

I claim:

1. In an accelerator for fishing jars connectable to a fishing pipe string and to a drill collar string, the mass of which moves a jarring hammer into engagement with an anvil: inner and outer telescopic bodies, one of said bodies having means for connecting it to the fishing pipe string, the other of said bodies having means for connecting it to the drill collar string, means between said bodies defining a compression chamber containing a compressible medium, compression piston means operable upon telescopic extension of said bodies to compress said medium to store energy tending to effect telescopic contraction of said bodies and accelerate said drill collar string, said compressible medium comprising a body of resiliently compressible material and a fluid pressure transfer material in engagement therewith, the volume of said compressible material being decreased on its compression by said fluid pressure transfer material pressurized by relative movement between said telescopic bodies.

2. An accelerator as defined in claim 1, said body being composed of rubber-like material having a low bulk modulus.

3. An accelerator as defined in claim 1, said body being composed of silicone rubber.

4. An accelerator as defined in claim 1, said body having a high impedance to the transmission of sound therethrough as compared to the fluid pressure transfer material.

5. An accelerator as defined in claim 1, said fluid pressure transfer material comprising a lubricating oil.

6. An accelerator as defined in claim 1, said fluid pressure transfer material comprising a lubricating oil and said resiliently compressible body comprising rubber-like material.

7. An accelerator as defined in claim 1, said fluid pressure transfer material comprising a lubricating oil and said resiliently compressible body comprising silicone rubber.

8. An accelerator as defined in claim 1, said body having the characteristic that the product of its mass density times the speed of sound therethrough is lower than the product of the mass density times the speed of sound through said fluid pressure transfer material.

9. An accelerator as defined in claim 1, wherein said compression chamber is an annular chamber defined by opposing cylindrical walls of said telescopic bodies, said resiliently compressible body comprising a cylinder of rubber-like material disposed between said cylindrical walls and substantially filling said chamber.

10. An accelerator as defined in claim 1, wherein said compression chamber is an annular chamber defined by opposing cylindrical walls of said telescopic bodies, said resiliently compressible body comprising a cylinder of rubber-like material disposed between said cylindrical walls and having a radial thickness less than the radial distance between said opposing walls.

11. An accelerator as defined in claim 1, wherein said compression chamber is an annular chamber defined by opposing cylindrical walls of said telescopic bodies, said resiliently compressible body comprising a cylinder of rubber-like material disposed between said cylindrical walls and having a radial thickness less than the radial distance between said opposing walls, and coengageable stop means on said bodies for limiting telescopic extension of said telescopic bodies.

12. Apparatus for jarring a fish stuck in a well bore: comprising fishing tool means engageable with said fish, jarring means connected to said fishing tool means, a length of drill collars connected to said jarring means, accelerator means connected to said drill collars and having means for connecting said accelerator means to a pipe string by which said fishing tool means, said jarring means, said length of drill collars and said accelerator means are adapted to be lowered in the well bore to engage said fishing tool means with said fish, said accelerator means being constructed so that the wave front created upon actuation and release of said jarring means in response to the tension in said accelerator means and said length of drill collars is reflected downwardly by said accelerator means, said accelerator means including a resiliently compressible elastomeric medium, and means for compressing said medium upon tensioning said accelerator means.

13. Apparatus for jarring a fish stuck in a well bore as defined in claim 12, wherein said means for compressing said medium comprises a compression chamber in said accelerator containing said elastomeric medium and a pressure transfer fluid for applying pressure to said medium.

14. Apparatus for jarring a fish stuck in a well bore as defined in claim 12, wherein said means for compressing said medium comprises a compression chamber in said accelerator containing said elastomeric medium and a pressure transfer fluid for applying pressure to said medium, said medium being composed of rubber having a low bulk modulus.

15. Apparatus for jarring a fish stuck in a well bore as defined in claim 12, wherein said means for compressing said medium comprises a compression chamber in said accelerator containing said elastomeric medium and a pressure transfer fluid for applying pressure to said medium, said medium being composed of rubber having a low bulk modulus and said fluid being a lubricating oil.

16. Apparatus for jarring a fish stuck in a well bore as defined in claim 12, wherein said means for compressing said medium comprises a compression chamber in said accelerator containing said elastomeric medium and a pressure transfer fluid for applying pressure to said medium, said medium being composed of silicone rubber.

17. Apparatus for jarring a fish stuck in a well bore as defined in claim 12, wherein said means for compressing said medium comprises a compression chamber in said accelerator containing said elastomeric medium and a pressure transfer fluid for applying pressure to said medium, said medium being composed of silicone rubber, and said pressure transfer fluid being a lubricating oil.

* * * * *